March 8, 1932. J. B. TAYLOR 1,848,808

FILM SOUND REPRODUCER

Filed June 20, 1930

Inventor:
John B. Taylor,
by Charles W. Tulla
His Attorney.

Patented Mar. 8, 1932

1,848,808

UNITED STATES PATENT OFFICE

JOHN B. TAYLOR, OF SCHENECTADY, NEW YORK, ASSIGNOR TO GENERAL ELECTRIC COMPANY, A CORPORATION OF NEW YORK

FILM SOUND REPRODUCER

Application filed June 20, 1930. Serial No. 462,648.

My invention relates to apparatus for reproducing sound from a film record thereof. It relates particularly to a special form of reproducing apparatus adapted for use in playing, examining and analyzing any desired portion of a sound film record. Incidental to the cinemaphone art, it is often desirable to examine visually and to listen repeatedly to some particular word or tone occurring at one or more points on a strip of film which may for example be several hundred or a thousand feet long. Apparatus now in common use for the commercial reproduction of sound film records is not well adapted to such detail scrutiny so that much time with unnecessary wear and tear on film and apparatus is entailed in the process of listening several times to the same portion of the record. One object of my invention is the provision of improved reproducing apparatus which shall avoid the above noted disadvantages and shall facilitate playing, examining and analyzing any desired portion of a film sound record. Another object of my invention is the provision of improved reproducing apparatus by which the sound film may be advanced as slowly as desired while searching for a particular word or tone thereon without affecting the relative speed of the film and the cooperating reproducing mechanism.

My invention will be better understood from the following description taken in connection with the accompanying drawings, and its scope will be pointed out in the appended claims.

Figure 1:
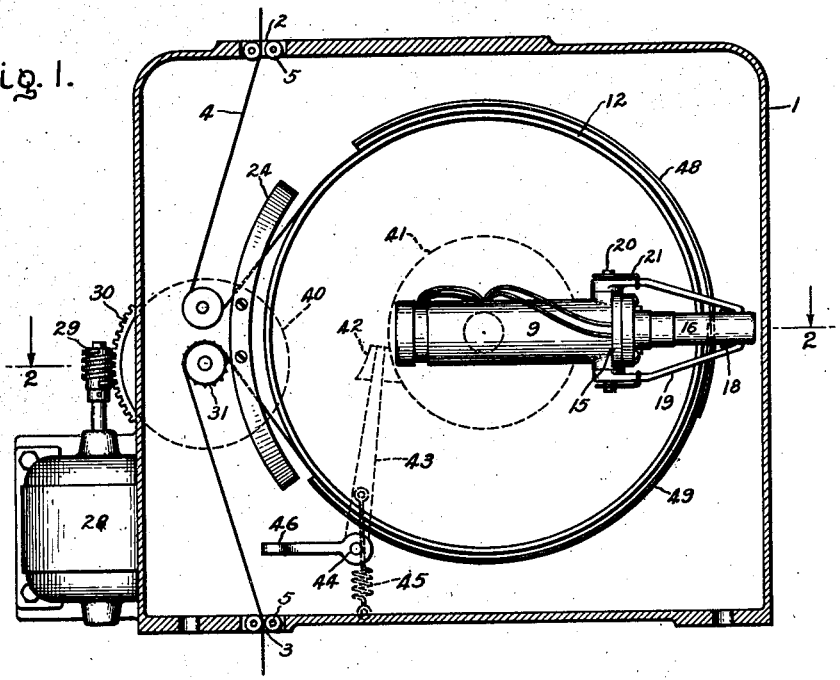
Figure 2:
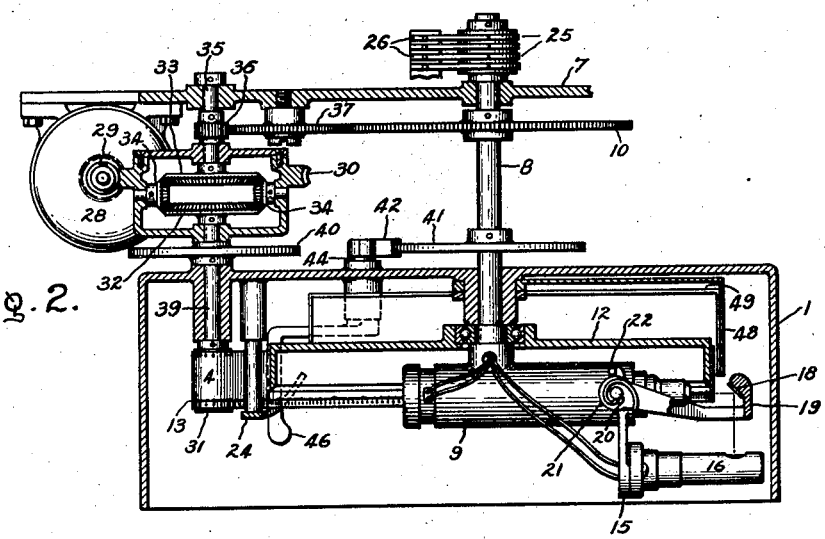

Referring to the drawings, Fig. 1 is a front view of reproducing apparatus involving my invention and Fig. 2 is a cross section taken on the line 2—2 of Fig. 1.

In Fig. 1 of the drawings I have shown the apparatus partly enclosed by a simple casing 1 which is shown open at the front and which has openings 2 and 3 at the top and bottom respectively through which the film 4 bearing a sound record is adapted to pass. The openings 2 and 3 are shown provided with small film guide rollers 5, the film being drawn from a suitable take-off reel, not shown, located above the casing and being fed to a suitable take-up reel, also not shown, located below the casing. Journaled in bearings in the casing 1 and in the rear plate 7 which is rigid with the casing is the shaft 8 at one end of which is secured the optical system 9 and to which is secured the drive gear 10. Mounted for free rotation on the shaft 8 is the drum 12 which supports the film 4 bearing the sound record 13 adjacent one edge of the film which edge it will be noted is allowed to overhang the end of the drum. The optical system 9 is of well known construction including an electric lamp at one end and suitable means for focusing on the sound record a very narrow band of light. The light after traversing the sound record falls upon a photoelectric cell by which the light variations produced by the sound record are converted into electric variations. If desired the photoelectric cell may comprise an elongated tube which is curved to conform to the curvature of the drum and which is arranged in position to receive the light passing through the sound record. I prefer, however, to provide a photoelectric cell of the form in common use and mount this cell upon the optical system 9 and to rotate therewith. For this purpose I have shown the optical system provided with bracket 15 to which the photoelectric cell 16 is secured. A small mirror 18 for reflecting the light beam into the cell 16 is carried by a bracket 19 shown pivotally mounted at 20 on the optical system 9. Spring 21 yieldingly holds the bracket 19 in the position illustrated wherein an ear on the bracket engages the stop 22 on the optical system. Where the film 4 enters and leaves the drum I have provided the cam 24 which is supported from the casing 1 and is arranged to engage the outer end portion of the mirror holding bracket 19 so as to swing the mirror and bracket clear of those portions of the film entering and leaving the drum. The electrical connections for the lamp of the optical system and for the photoelectric cell are run through the shaft 8 and connected with the several slip rings 25 against which rest the several brushes 26.

For driving the film and the optical system I have shown the electric motor 28 secured to the frame 7. On the shaft of the motor 28 is the worm 29 which meshes with worm wheel 30. Movement of worm wheel 30 is communicated to the optical system 9 and to the sprocket 31 by means of a differential device whereby the film and the light beam from the optical system have a relative movement which is suitable for sound reproduction, as for example 90 feet per minute. The differential device may be of any well known construction and is shown, for example, as comprising the two beveled sun wheels 32 and 33 both of which are engaged by the two planet wheels 34. Sun wheel 33 is mounted on shaft 35 to which also is secured the pinion 36 and connecting this pinion with the gear 10 is the idler gear 37. Sun wheel 32 is mounted on shaft 39 to which is secured the sprocket 31. Mounted on the shafts 39 and 8 are the two brake disks 40 and 41 respectively against one or the other of which the brake 42 is adapted to be pressed for checking the motion of either the film or the optical system. Brake 42 is shown, for example, as mounted on the arm 43 pivoted at 44 to the housing 1 and biased to engage either of the two brake disks by spring 45 which is arranged to throw over the center of the pivot 44 to either of the disk engaging positions of the brake. By means of a small finger piece 46 secured to the pivot 44 the brake may be thrown readily from one brake disk to the other or may have its pressure against either disk partially relieved. At 48 and 49 I have shown two segmental shields which are rotatably mounted on the bearing of shaft 8 and are adapted to be slid forward to a position intercepting light passing from the optical system to the mirror 18. These shields are provided for the convenience of the operator in locating a particular word or tone on the film as will clearly appear in the description of the operation to follow.

The apparatus which I have shown and described, while not primarily intended to be used for the ordinary reproduction from a film record, may be so used if desired. It is particularly adapted for use in editing sound film records inasmuch as it enables the operator to find readily any particular portion of the record which he may wish to examine closely and, having found it, to replay it again and again in rapid succession. For the straight reproduction of the record the machine is operated with the brake 42 engaging the brake disk 41, thereby holding the optical system against rotation while the sprocket 31 draws the film through the machine at the regulation speed of ninety feet per minute. By means of a suitable loud speaker or head set connected through the usual amplifying devices to the brushes 26 leading to the photoelectric cell 16 the operator listens to the reproduced record. If, for example, a particular word or tone is reached which he wishes to repeat for closer examination he has only to press the finger piece 46 to throw the brake from disk 41 to disk 40. The movement of the film is thereby stopped and the optical system rotated instead. At each revolution, that part of the record supported by the drum is repeated. For more closely locating the particular word or tone, one or the other of the shields 48 and 49 may be slid forward and rotatably adjusted while the word or tone is being repeated. If the operator desires to make a detail scrutiny of the entire film or of portions thereof he may, by pressing lightly upon the finger piece 46, suitably vary the pressure of the brake on the disk 41 to cause the film slowly to pass through the apparatus while he listens. Since the relative movement between film and optical system is always the same, what he hears in this case is a series of repetitions with a constant progression along the record. Obviously the rate of progression may be varied from a zero to a maximum value at the will of the operator, also when the particular portion sought for has been located the motor may be stopped and the portion marked in any desired manner.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is,—

1. Sound reproducing apparatus comprising means for supporting a limited selected portion of a relatively long film having a sound record thereon extending linearly thereof and means for reproducing repeatedly from said portion only.

2. Apparatus for reproducing sound from a relatively long film record thereof comprising means for reproducing repeatedly from a short length of the record and means for simultaneously advancing the record through the apparatus.

3. Apparatus for reproducing sound from a film record comprising a constant speed driving member, means for moving a portion of a record film, reproducing means including a movable member arranged to cooperate with said film portion, means for producing a fixed relative movement between said film portion and said member and means for varying the actual movement of said film moving means.

4. Apparatus for reproducing sound from a film record thereof, comprising means adapted to cooperate with a record film for reproducing the sound recorded thereon, means for moving said means and said film in opposite directions at a fixed relative speed and means operative simultaneously for varying the actual speed of the film.

5. Apparatus for reproducing sound from a film record comprising means for moving a portion of a record film, reproducing means including a movable member for projecting light on said portion, a common driving member having a differential connection with said moving means and said member, and means for controlling the speed of said moving means.

6. Apparatus for reproducing sound from a film record comprising a drum for rotatably supporting a portion of a record film, a sprocket for driving the film, reproducing means including a member rotatably mounted concentrically with said drum for projecting a light beam on said film portion, a driving motor, a differential device connecting the motor with the sprocket and the member, and means by which the speed of the sprocket may be manually controlled.

7. Apparatus for reproducing sound from a film record comprising a drum for rotatably supporting a portion of a record film, a sprocket for driving the film, reproducing means including a member rotatably mounted concentrically with said drum for projecting a light beam on said film portion, a driving motor, differential gearing connecting said motor with said sprocket and said member and braking means for varying the actual speed of the sprocket.

8. Apparatus for reproducing sound from a film record comprising means for moving the film, reproducing means including a rotatable member for projecting a light beam on the film, a driving motor, a differential device connecting the driving motor with said film moving means and with said member, and braking means for holding stationary either said film driving means or said member.

In witness whereof, I have hereunto set my hand this 19th day of June, 1930.

JOHN B. TAYLOR.